Patented Aug. 28, 1962

3,051,611
HYDROLYSIS OF BAGASSE
José Ramón de la Vega Falcón and Emiliano Ramos Rodriguez, Vedado, Havana, Cuba, assignors of seventy-five percent to Instituto Cubano de Investigaciones Tecnologicas, Havana, Cuba, and twenty-five percent to Universidad de Villanueva, Marianao, Cuba, both corporations of Cuba
No Drawing. Filed Nov. 16, 1959, Ser. No. 852,936
13 Claims. (Cl. 162—68)

The present invention relates to a process for hydrolysing sugar cane bagasse selectively to reduce the pentosan contents of the bagasse without excessive degradation of the holocellulose content.

One of the problems involved in the preparation of cellulose for chemical purposes from bagasse resides in the difficulty of eliminating the pentosan fraction because hydrolysis of the raw cellulose material not only acts on the pentosans but also on the cellulose. During hydrolysis the cellulose material is treated with water at elevated temperatures and the water tends to break the chains of all the polysaccharides so as to degrade both the cellulose and the pentosans. Since the pentosan chains are shorter, they will form, upon the degradation of the polysaccharides, many short chain polysaccharides, many of which are soluble in water. On the other hand, the degradation of the hexoses tends to shorten the cellulose chains, thereby producing shorter hexoses which are also soluble. This diminishes the degree of polymerization of the holocellulose. While the reduction in size of the pentosan chains is desirable, the degradation of the cellulose is not and it is, therefore, highly preferable that the hydrolysis be carried out in such a manner as to keep the degradation of the holocellulose at a minimum.

Holocellulose is defined as the total carbohydrate constituents of the plant material, exclusive of lignin but including the pentosans, cellulose, etc.

The ultimate cellulose product which is to be used for chemical purposes is primarily alpha cellulose and, therefore, the hydrolysis should be carried out in such a manner to preserve as much of the alpha cellulose of the raw material as possible.

When the hydrolysis of bagasse is effected at a temperature in excess of 212° F. and at the saturating pressure of the system, equal parts of pentosan and hexoses are dissolved. Since pentosan is present in the bagasse in a smaller amount, hydrolysis effects a reduction of the percentage of pentosan in the material. The amount of pentosans and hexoses degraded and dissolved depends on the temperature and the time of hydrolysis.

In the prior art methods of hydrolysis, in general, four hours of treatment at 340° F. is required to reduce the pentosan content of the bagasse to 5% while at 360° F. only two hours are necessary to reduce the pentosan content to this same value. Three hours at 360° F. may reduce the pentosan content to about 3%. Hydrolysis at 320° F. for three hours reduces the pentosan content to about 15%, while three hours hydrolysis at 340° F. reduces it to about 10%.

Although in the above processes the pentosan is reduced to desirable values, the degree of polymerization of the resultant holocellulose is also reduced.

The normal pentosan content of the bagasse on a dry basis ranges between 27 and 30%. The degree of polymerization of the holocellulose (that is, total carbohydrate content exclusive of lignin) present in raw bagasse varies with the ages and varieties of the sugar cane and ranges approximately between 800 to 1200. The degree of polymerization as used herein is determined according to the techniques of R. Mitchel (Ind. and Eng. Chem., 45, 2526). Briefly, according to this method the lignin is removed from the bagasse by means of chlorine dioxide which causes negligible changes in the carbohydrate fraction of cellulose containing materials.

According to the present invention, the bagasse is hydrolyzed with water so as to reduce the pentosan content without excessive degradation of the holocellulose. More particularly, the present invention is based upon the fact that it has been discovered that the degradation of holocellulose is very sensitive to the presence of traces of oxygen and/or carbon dioxide during hydrolysis. In other words, it has been discovered that the presence of oxygen and carbon dioxide catalyses the degradation of the cellulose during hydrolysis.

According to the present invention, bagasse is hydrolyzed with water at elevated temperatures and pressures in the absence of oxygen and carbon dioxide.

*Example 1*

100 parts of fresh bagasse (as it comes from the sugar mills) containing about 50% moisture is added to 500 parts of water which has been previously boiled to eliminate the oxygen. This mixture of bagasse and water is introduced into a digester which is evacuated to remove the air. The mixture is then heated until the temperature reaches 340° F. (104 pounds per square inch gauge pressure).

The escape valve of the digester is opened to eliminate the last traces of air so that only the gaseous steam in equilibrium remains therein. The boiling is continued for 3 hours, at the end of which time the mixture is cooled and the hydrolyzed bagasse is separated from the resultant solution. The bagasse is washed and pressed to eliminate the remaining water. The bagasse is then dried with hot air containing less than about 15% moisture. The final product contains on a dry basis 20% pentose, 10% lignin and 70% cellulose, 80% of the cellulose being alpha cellulose. The degree of polymerization of the holocellulose is 700.

*Example 2*

Water is boiled to eliminate oxygen and carbon dioxide and to the boiled water there is added sodium sulfoxylate ($Na_2S_2O_4$) in amount sufficient to obtain a concentration of 5 p.p.m. to eliminate the last traces of oxygen. 100 parts of fresh bagasse containing approximately 50% moisture is added to 500 parts of the water. The mixture is placed in a digester and a vacuum is created therein. The digester is then flushed and filled with nitrogen so as to eliminate the oxygen and the carbon dioxide in the gaseous phase. The digester is heated to 320° F. for three hours and then cooled, the bagasse being separated from the solution, as indicated in Example 1. The final product contains, on a dry basis 15% pentoses, 20% lignin, and 65% cellulose, 80% of the cellulose being alpha cellulose. The degree of polymerization of the holocellulose is 900.

The sodium sulfoxylate which is used to eliminate the last traces of oxygen may be added in an amount between 1 and 10 p.p.m. Under the conditions set forth in this example, the degree of polymerization of the holocellulose may vary between 900 and 965.

If fresh bagasse is hydrolyzed with water according to the prior art without the elimination of oxygen and carbon dioxide, hydrolysis for three hours at 320° F. results in the degree of polymerization of 560, as a maximum generally being about 400. Although the percent of pentosan obtained in the final product of Example 2 is slightly greater than that produced according to the prior art, the relative increase of the degree of polymerization is much greater than the relative increase corresponding to the percentage of pentosan in the final product.

Example 3

It has been further discovered that the presence of the acids produced during the hydrolysis of the bagasse also catalyzes the degradation of the cellulose. It was first thought that an addition of alkali to the water at the start of hydrolysis would serve to neutralize the acid as it is formed. However, to do so would means starting the water at an alkaline pH but this is not recommended. It is pointed out that the liquid resulting from the water hydrolysis of bagasse has a pH of about 4.

To avoid the acidification during the hydrolysis a buffer is added (this eliminates starting the hydrolysis under alkaline conditions). The buffer is obtained by neutralizing (to a pH of 7) the liquid resulting from the hydrolysis of previous batch of bagasse with an alkali such as sodium hydroxide. The salts formed during the neutralization are weak acid salts and these salts will act as a buffer to prevent the dropping of the pH as the concentration of the acids increases during the hydrolysis.

By way of example, the solution from a previous hydrolysis, that is, the liquid resulting from Examples 1 or 2 after the bagasse has been removed therefrom, is neutralized with an alkali such as sodium hydroxide. One part of this neutralized solution is admixed with three parts of previously boiled water. 500 parts of this mixture of water and solution is introduced into a digester with 100 parts of fresh bagasse having about a 50% moisture content. The digester is evacuated, heated to 380° F. and the exhaust valve is opened to eliminate the last traces of air. The temperature is maintained for three hours at the end of which the reaction mixture is cooled and the bagasse separated therefrom, as indicated in Examples 1 and 2. The final product contains on a dry basis 5% pentoses, 20% lignin and 75% cellulose, 80% of the cellulose being alpha cellulose. The degree of polymerization of the holocellulose of the resulting product is 600.

After the bagasse has been hydrolyzed as set forth in Examples 1-3 to reduce the pentosan content, the bagasse is subjected to conventional chemical treatment to produce the chemical pulp. This treatment involves the digestion of the hydrolyzed bagasse to remove therefrom the lignin and other non-cellulosic constituents.

According to the present invention the bagasse is hydrolyzed with water at a temperature above the boiling point of water at normal atmospheric pressure and at the saturating pressure of the system, that is, at the pressure and temperature in which the liquid and water vapor phases are in equilibrium. Preferably, the temperature varies between about 250° F. and 400° F. the time of treatment being between about one-half and five hours, depending upon the temperature at which the hydrolysis is effected, the higher the temperature the shorter the time of treatment. The hydrolysis is continued until the final product contains less than about 20% pentosans on a dry basis and prefarably less than 15%, the degree of polymerization of the holocellulose being in excess of about 500. More preferably, the temperature of hydrolysis is between about 300 and 380° F. and the time is between one and four hours. The optimum temperature is between about 320 and 360° F. and the optimum time is between two and three hours, the product containing between 5-15% pentoses wherein the degree of polymerization of the holocellulose is between 500 and 965. The ratio of water to bagasse during the hydrolysis is not critical and may vary as in the prior art processes. However, the most desirable ratio is one part of bagasse to five parts of water. The above temperatures, times and proportions apply equally whether the water used during hydrolysis is fresh water as set forth in Examples 1 and 2 or whether from a previous hydrolysis as set forth in Example 3.

It is again pointed out that according to the present invention excessive degradation of holocellulose during hydrolysis is minimized by performing the hydrolysis under conditions free of oxygen and carbon dioxide, these conditions being obtained by boiling the water and by carrying out the hydrolysis in an inert atmosphere, that is, an atmosphere free of oxygen and carbon dioxide, the inert atmosphere being preferably constituted only by water vapor in equilibrium with the liquid phase or by water vapor and an inert gas such as nitrogen. In this manner the catalytic effect of oxygen and carbon dioxide on the degradation of the cellulose is avoided.

We claim:

1. A process of hydrolyzing bagasse to reduce the proportion of pentosans while minimizing the reduction in the degree of polymerization of the holocellulose comprising hydrolyzing the bagasse with a hydrolyzing agent consisting essentially of water free of oxygen and carbon dioxide at a temperature above the boiling point of water at atmospheric pressure and at the saturating pressure of the system.

2. A process as recited in claim 1 wherein the hydrolysis is carried out at a temperature between about 250° F. and 400° F. for a time between about one-half and five hours, said hydrolysis being continued until the pentosan content of the bagasse, on a dry basis, does not exceed about 20%.

3. A process as recited in claim 2 wherein the hydrolysis is continued until the pentosan content does not exceed about 15%.

4. A process of hydrolyzing bagasse to reduce the proportion of pentosans while minimizing the reduction in the degree of polymerization of the holocellulose comprising hydrolyzing the bagasse with a hydrolyzing agent consisting essentially of water free of oxygen and carbon dioxide at a temperature between about 300° F. and 380° F. at the saturating pressure of the system for a time between one hour and four hours until the pentosan content of the bagasse, on a dry basis, does not exceed about 15%.

5. A process of hydrolyzing bagasse as recited in claim 4 wherein the hydrolysis is carried out at a temperature between about 320° F. and 360° F. for a time between about two and three hours.

6. A process of hydrolyzing bagasse to reduce the proportion of pentosans while minimizing the reduction in the degree of polymerization of the holocellulose comprising boiling a hydrolyzing agent consisting essentially of water to remove the oxygen and carbon dioxide therein and hydrolyzing bagasse with said hydrolyzing agent at a temperature above the boiling point of water at atmospheric pressure and at the saturating pressure of the system.

7. A process of hydrolyzing bagasse as recited in claim 6 wherein there is added to the water after boiling sodium sulfoxylate sufficient to obtain a concentration between about 1–10 p.p.m. to remove residual traces of oxygen.

8. A process of hydrolyzing bagasse to reduce the proportion of pentosans while minimizing the reduction in the degree of polymerization of the holocellulose comprising hydrolyzing the bagasse with a hydrolyzing agent consisting essentially of water free of oxygen and carbon dioxide at a temperature above the boiling point of water at atmospheric pressure and at the saturating pressure of the system, said hydrolyzing being conducted in an atmosphere which is inert except for the presence of water vapor.

9. A process of hydrolyzing bagasse as recited in claim 8 wherein the inert atmosphere is a nitrogen atmosphere.

10. A process of hydrolyzing bagasse to reduce the proportion of pentosans while minimizing the reduction in the degree of polymerization of the holocellulose comprising boiling a hydrolyzing agent consisting essentially of water to remove the oxygen and carbon dioxide therein, admixing said boiled hydrolyzing agent with bagasse in a digester, boiling said mixture to flush the air from the digester and hydrolyzing the bagasse at a temperature above the boiling point of water at atmospheric pressure and at the saturating pressure of the system.

11. A process of hydrolyzing bagasse to reduce the proportion of pentosans while minimizing the reduction in the degree of polymerization of the holocellulose comprising boiling a hydrolyzing agent consisting essentially of water to remove the oxygen and carbon dioxide therein, admixing said boiled hydrolyzing agent with bagasse in a digester, flushing the digester with nitrogen, and hydrolyzing the bagasse at a temperature above the boiling point of water at atmospheric pressure and at the saturating pressure of the system.

12. A process as recited in claim 11 wherein sodium sulfoxylate is added to the water in an amount sufficient to obtain a concentration between about 1–10 p.p.m. to eliminate the last traces of oxygen.

13. A process of hydrolyzing bagasse as recited in claim 1 wherein the water comprises the liquid obtained from a previous hydrolysis of bagasse neutralized by the addition thereto of an alkali.

References Cited in the file of this patent

UNITED STATES PATENTS

| | | |
|---|---|---|
| 1,721,376 | De La Roza | July 16, 1929 |
| 1,790,260 | Cable | Jan. 27, 1931 |
| 1,891,732 | Sheperd | Dec. 20, 1932 |
| 2,582,054 | Michon | Jan. 8, 1952 |
| 2,883,826 | Smith | Apr. 28, 1959 |

FOREIGN PATENTS

| | | |
|---|---|---|
| 169,802 | Great Britain | Oct. 3, 1921 |
| 834,093 | France | Aug. 1, 1938 |